(12) United States Patent
Turato (10) Patent No.: US 11,189,167 B2
(45) Date of Patent: Nov. 30, 2021

(54) CONNECTED USER COMMUNICATION AND INTERFACE SYSTEM WITH SHUTTLE TRACKING APPLICATION

(71) Applicant: AVIS BUDGET CAR RENTAL, LLC, Parsippany, NJ (US)

(72) Inventor: John Turato, Parsippany, NJ (US)

(73) Assignee: AVIS BUDGET CAR RENTAL, LLC, Parsippany, NJ (US)

( * ) Notice: Subject to any disclaimer, the term of this patent is extended or adjusted under 35 U.S.C. 154(b) by 131 days.

(21) Appl. No.: 16/178,442

(22) Filed: Nov. 1, 2018

(65) Prior Publication Data

US 2019/0130745 A1    May 2, 2019

Related U.S. Application Data

(60) Provisional application No. 62/580,006, filed on Nov. 1, 2017.

(51) Int. Cl.
*G08G 1/123* (2006.01)
*G01C 21/36* (2006.01)
*G06Q 50/30* (2012.01)
*G06F 16/29* (2019.01)

(52) U.S. Cl.
CPC ......... *G08G 1/123* (2013.01); *G01C 21/3676* (2013.01); *G06F 16/29* (2019.01); *G06Q 50/30* (2013.01)

(58) Field of Classification Search
None
See application file for complete search history.

(56) References Cited

U.S. PATENT DOCUMENTS

| | | | |
|---|---|---|---|
| 2015/0330798 A1* | 11/2015 | Nandan | G01C 21/32 701/409 |
| 2016/0356613 A1* | 12/2016 | Hajj | G01C 21/3484 |
| 2017/0123422 A1 | 5/2017 | Kentley et al. | |
| 2017/0262786 A1 | 9/2017 | Khasis | |
| 2017/0270790 A1* | 9/2017 | Neiger | G08G 1/127 |

OTHER PUBLICATIONS

International Search Report and Written Opinion, PCT/US18/058786, Avis Budget Car Rental, LLC (international filing date Nov. 1, 2018).

* cited by examiner

*Primary Examiner* — Jonathan M Dager
*Assistant Examiner* — Garrett F Evans
(74) *Attorney, Agent, or Firm* — Wayne Edward Ramage; Baker Donelson (57) ABSTRACT

A system and connected user mobile device interface for tracking one or more shuttle buses and providing a visual display thereof along with estimated times of arrival at the connected user's location or at the shuttle bus stop closest to the connected user. The tracking system is a learning-based model that tracks vehicle movement to estimate arrival time at pre-determined geo-fence locations based on historical behavior for similar time periods and conditions.

14 Claims, 10 Drawing Sheets

CONNECTED USER COMMUNICATION AND INTERFACE SYSTEM WITH SHUTTLE TRACKING APPLICATION

This application claims benefit of and priority to U.S. Provisional Application No. 62/580,006, filed Nov. 1, 2017, which is incorporated herein by specific reference for all purposes.

FIELD OF INVENTION

This invention relates to a system and related methods for management of communications and interfacing between a user and a connected fleet of vehicles.

SUMMARY OF INVENTION

In various embodiments, the present invention comprises a system and connected user mobile device interface for tracking one or more shuttle vehicles (e.g., shuttle buses) and providing a visual display thereof, along with estimated times of arrival at the connected user's location or at the shuttle vehicle stop closest to the connected user. The tracking system is a learning-based model that tracks vehicle movement to estimate arrival time at pre-determined eo-fenced locations based on historical behavior for similar time periods and conditions. The shuttle vehicles may comprise shuttle buses at an airport, rental vehicle service shuttle buses at an airport, shuttle buses to transport any passengers to and from a location (e.g., museum, theater, party, or the like), commercial or public transportation buses, or similar vehicles.

In one embodiment, the present invention comprises a system for tracking shuttle vehicles, comprising a plurality of shuttle vehicles, each shuttle vehicle configured with a telematics control unit or a GPS device operable to determine shuttle vehicle location along a planned route, and an in-vehicle computing device with a device microprocessor; at least one computer server with a server microprocessor programmed to: store a route map encompassing the planned route, wherein the route map comprises one or more geo-fence area polygons corresponding to shuttle vehicle stop sites, and one or more geo-fence area polygons corresponding to shuttle vehicle route sites separate from the shuttle vehicle stop sites; and store historical travel time data for shuttle vehicles travelling along the route map; wherein the device microprocessor in each shuttle vehicle is programmed to determine when that shuttle vehicle enters or leaves a shuttle vehicle stop site or shuttle vehicle route site, and transmit a report the entering or leaving, and the time thereof, via wireless electronic communications to the at least one computer server; and further where the server microprocessor is programmed to calculate an expected time of arrival or until arrival for a shuttle vehicle to arrive at a particular shuttle vehicle stop site. The device microprocessor determines when that particular shuttle vehicle enters or leaves a shuttle vehicle stop site or shuttle vehicle route site by comparing the shuttle vehicle's GPS location as determined by the vehicle's telematics control unit or a GPS device with location data for said geo-fence area polygons along the route. The system may also include a user or customer mobile computing device with a microprocessor programmed to receive, via wireless electronic communications in real-time, shuttle vehicle location information from the server microprocessor; receive, via wireless electronic communications in real-time, estimated arrival time or times for one or more shuttle vehicles at one or more locations along the planned route; and present, on a visual display in real-time, a map showing one or more of the following: location of the mobile computing device; location of one or more shuttle vehicles; and one or more locations along the planned route, wherein the one or one or more locations along the planned route comprise one or more shuttle vehicle stop sites. Further, the visual display may comprise one or more estimates of time for a shuttle vehicle to arrive at a particular shuttle vehicle stop site, wherein the calculation of expected time of arrival or until arrival is performed based upon the particular shuttle vehicle's last report with regard to entering or leaving a shuttle vehicle stop site or shuttle vehicle route site, the route-based relationship of such reported shuttle vehicle stop site or shuttle vehicle route site to the particular shuttle vehicle stop site, and a selected subset of said historical travel time data. The calculation of expected time of arrival or until arrival is not based on general traffic usage, patterns, or conditions for the area in which the planned route is located. The selected subset of said historical travel data may comprise data for a particular time of day, for a particular day of the week, for a particular date, or for a historical time data window. The window may extend back continuously for a set period of time from the time of calculation, or may be limited to a selected period of time from the prior year. The shuttle vehicle route sites may include deviation sites not overlaying the planned route, and are placed to indicate shuttle vehicle deviations from the planned route.

DETAILED DESCRIPTION OF EXEMPLARY EMBODIMENTS

In various exemplary embodiments, the present invention comprises a system and related methods for management of communications and interactions between a user and a connected fleet of vehicles. A "connected fleet" comprises a plurality of vehicles, some or all equipped with (i) on-board sensors and computer systems for monitoring and capturing the operational status and performance of vehicle systems and components, and (ii) one or more electronic control and/or communications units for two-way or multiple pathway communication with one or more fleet management servers or networks, outside data centers or sources, other vehicles, and individual user or driver computing devices. A "connected user" comprises a user with one or more computing devices, including, but not limited to, mobile computing devices such as smart phones, tablets, or wearable devices, that provide extended, continuous, uninterrupted electronic communications with various computer networks, devices, and systems, including, but not limited to, elements of the connected fleet computing system or network, regardless of where the user is and how they are connected. Connected users may include, but are not limited to, drivers, passengers, customers, renters, members of a vehicle sharing service, employees, owners, or operators.

Vehicles in a connected fleet may include, but are not limited to, automobiles, trucks, vans, buses, motorcycles, bicycles, mopeds, construction and utility vehicles, battery-powered carts, golf carts, airplanes, aircraft, boats, watercraft, and the like. Vehicles may be controlled by a driver or user, or autonomous or semi-autonomous. A fleet may include, but is not limited to, a rental vehicle fleet, shared vehicle fleet, peer-to-peer or business-to-business transportation fleet, taxi-cab fleet, corporate vehicle fleet, municipal or governmental agency vehicle fleet, bus fleet, utility or construction vehicle fleet, truck fleet, or combinations thereof. A fleet may be homogenous or heterogeneous (i.e., a mixed fleet). Fleets may be combined to make larger fleets, and fleets may also be sub-divided into component fleets by various parameters (e.g., type of use, type of customer or user, country, state, city, county, or other defined geographical area). The term "fleet" as used herein includes fleets of all types and various combinations, components or sub-divisions thereof.

As described in detail below, in several embodiments the present invention comprises a unique, single integrated platform for communications between a connected user and a connected fleet management system. The connected fleet management system manages fleet planning, in-fleeting operations, vehicle acquisition and provisioning, vehicle assignment, vehicle transfers (i.e., to another fleet or another component fleet in the larger fleet), vehicle use operations (i.e., reservations, use and return by a customer, member, driver or user), vehicle servicing, vehicle maintenance and repairs, and de-fleeting operations (e.g., removal of the vehicle from the fleet, return to manufacturer, or sale to third parties).

Within this context, the system provides a variety of user-facing applications and interfaces, including applications which may be installed and run on a mobile computing device of the user for various functions. These functions include, but are not limited to, user registration or enrollment, user reservation management, user access to a fleet vehicle, communication between the user and the fleet management system during use (including, but not limited to, providing roadside or emergency assistance), and return of the fleet vehicle.

In several exemplary embodiments, the present invention comprises one or more systems or applications for enrolling or registering users. Types of users vary depending on the nature of the fleet. For example, users may be employees of the owner of a corporate or municipal utility fleet, authorized drivers of a bus fleet, drivers of taxi-cabs, renters or customers of a car rental agency, or members of a car sharing service. Accordingly, the types of user registration or enrollment system will vary as well. In general, the user enrollment or registration component collects necessary information from the users, and reviews potential users backgrounds and qualifications, including, but not limited to, user training, licensure reviews, background checks, and credit checks, as appropriate. In some business models, enrollment may comprise an application and acceptance as a member of a car sharing or similar service. Advertising or other means of solicitation of potential users may be included. In some cases, users may not be previously enrolled prior to an initial reservation or use, and some or all of these checks may be performed at the time the user reserves a vehicle or initially takes possession of a vehicle.

Users of a particular fleet may be divided into different categories or classifications (e.g., a preferred or frequent driver program for a car rental company, or users licensed for certain types of vehicles). In several embodiments, the system may comprise a "trusted user" program, where the user has meet certain pre-qualifications and undergone substantive background and credit checks. A "trusted user" may receive certain advantage and perquisites, such as access to special vehicles, quicker and easier access to vehicles, and quicker and easier returns.

Figure 1:
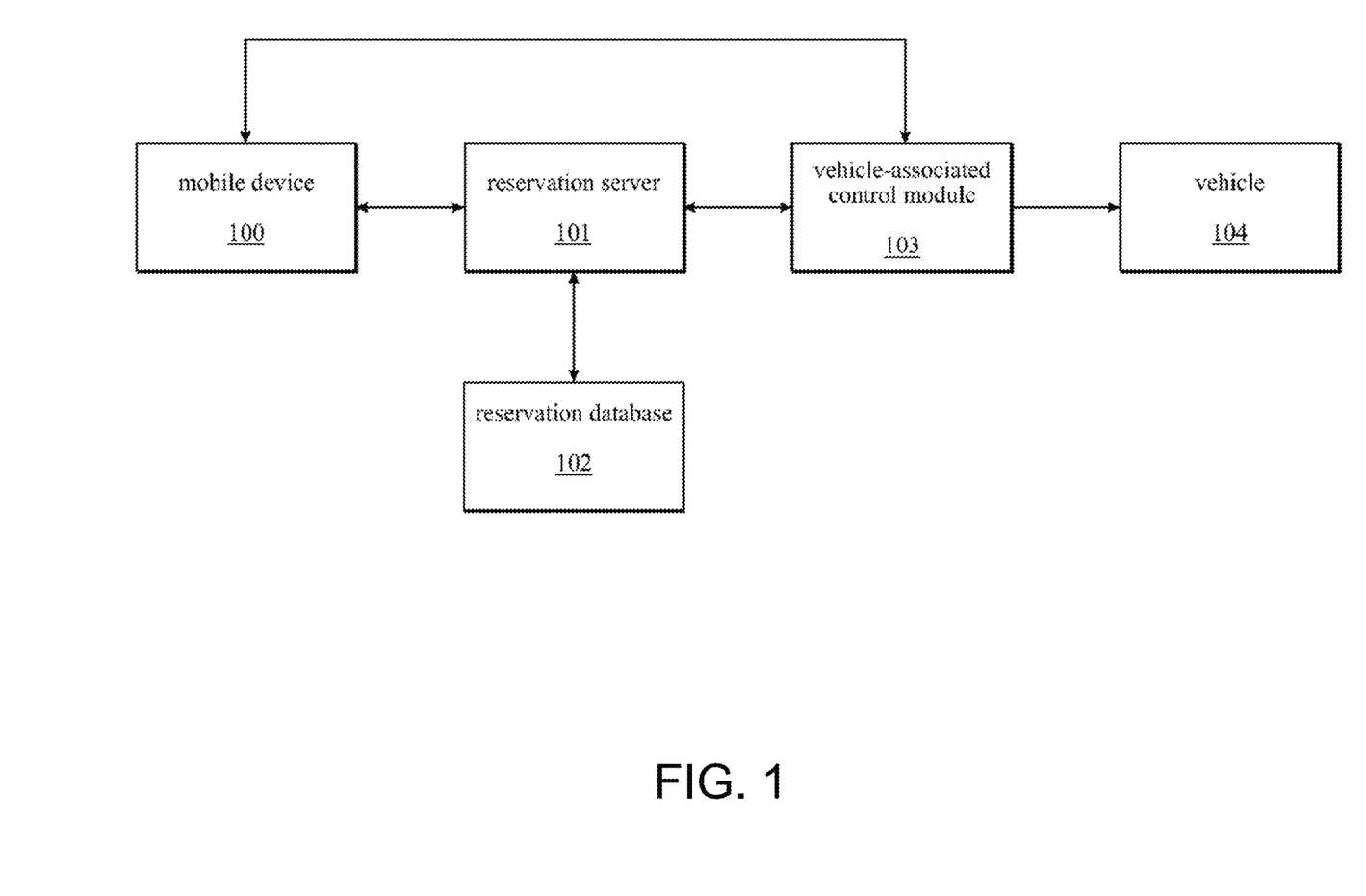
FIG. 1 illustrates the system architecture of a mobile device used to communicate with a vehicle and reservation server of a connected fleet.

In several embodiments, the present invention further comprises one or more reservation systems or applications. These comprise both user-facing and internal fleet system elements. An example of a multi-tiered fleet management reservations database caching system is described in U.S. Pat. No. 9,576,254 (issued Feb. 21, 2017 to Zipcar, Inc.), which is incorporated herein by specific reference for all purposes. Examples of a reservations interface for a user to identify available vehicles and make a reservation are provided in U.S. Pub. No. 2013/0226633 (published Aug. 29, 2013 by Zipcar, Inc.) and U.S. Pub. No. 2011/0060480 (published Mar. 10, 2011 by Zipcar, Inc.), which are incorporated herein by specific reference for all purposes. In one exemplary embodiment, for example, as seen in FIG. 1, a mobile device 100 runs a mobile device application for reserving and accessing a reservable asset, such as a vehicle 104. The mobile device application can be installed on the mobile device or it can be accessed through a web application. The mobile device electronically communications with a reservation server 101 that is part of a connected fleet management system. The reservation server is in communication with a reservation database 102. The reservation server provides information about reservable vehicles to the mobile device, including reservable assets (typically for a requested time period and location of interest). The mobile device application may display a map of locations of reservable vehicles, enabling users to search and view locations as desired. The mobile device application also may display reservable vehicles in list format. Users may mark certain vehicle types, or specific vehicles, as a "favorite" for facilitating future searches.

The present invention further comprises a vehicle access component, that also may comprise both user-facing and internal fleet system elements. This may be part of the reservations system or work in conjunction with a reservations system. The user seeks access in a variety of ways, including, but not limited to, obtaining keys to the vehicle from a car rental agent, presenting an authorized user card to a card reader in the vehicle, or using a mobile computing device to communicate with a TCU or dedicated access unit in the vehicle, as discussed above. Examples of access control systems are disclosed in U.S. Pat. No. 9,442,888 (issued Sep. 13, 2016) and U.S. Pat. No. 9,635,518 (issued Apr. 25, 2017), which are incorporated herein by specific reference for all purposes.

In cases where the user is attempting key-less access to a connected vehicle, such as by wireless communication with a user's mobile computing device, there are several methods to determine whether to allow access. In some cases, access may be permitted if the user is a pre-authorized registered user, and presents a general access code or authorization to the vehicle. In other cases, reservation data (either for a single reservation or for reservations over a period of time, which can be a day or several days) has been previously electronically communicated to the vehicle (e.g., transmitted to a TCU in the vehicle) and stored therein, and access is permitted if a user attempting access matches corresponding reservation data (i.e., user identity, time period, and the like). Alternatively, after receiving an access request from a user, the vehicle (i.e., through TCU or similar unit) electronically communicates with the fleet management system to confirm whether or not to allow access. In cases where the vehicle cannot establish direct communication access, it may attempt to establish communication through other connected vehicles, through the user's mobile device, or other wireless access points.

In some cases, such as an underground garage or parking area, the vehicle and user's computing device may be unable to establish outside communications links in any fashion. In several embodiments, the fleet management system of the present invention previously provides a protected, secure, single-use token to the user's computing device upon making a reservation (or close to the starting time of the reservation), which is then securely communicated to the vehicle by the user's computing device through local wireless communications means (e.g., BLE, NFC, and the like). The vehicle processes the token, and allows access if the information in the token is valid.

After access is allowed, the period of use commences. During use, as described above, the connected vehicle (or a TCU or a similar unit in the vehicle) provides various information to the fleet management system. The fleet management system may directly or indirectly monitor some or all of the period of use. In several embodiments, the fleet management system monitors the period of use for emergency situations, which may be reported by the user through an application on the user's mobile device or a unit in the vehicle. The user can establish connection directly with the fleet management system or an road-side assistance or emergency response team or service, and request assistance.

In several embodiments, the user may communicate an incident or accident in real-time or near real-time during the use period. Information may be gathered in real time by the user using the application on their mobile computing device, including descriptions and pictures of any damage to the vehicle. This information can then be provided to the fleet management system's servicing or maintenance components for advance planning and scheduling prior to return of the vehicle.

The user may be contacted if the fleet management system detects that the vehicle may be returned late, or at a different location than identified in the reservation, as described in U.S. Pub. No. 2013/0246102 (published Sep. 19, 2013 by Zipcar, Inc.) which is incorporated herein by specific reference for all purposes. The fleet management system can assist the user in extending or modifying the reservation if necessary, and may contact other users that may be affected by the late return.

The present invention further comprises vehicle return applications or components, which handle, among other things, determination of the vehicle status and condition, invoicing of the user (where appropriate), and forwarding of the vehicle for any servicing, maintenance, or repairs that may be required. These also may comprise user-facing and internal fleet elements. For example, a user may return a vehicle to a planned drop-off location, then automatically check-in through an application on their mobile computing device. The user may be prompted to confirm mileage and gas levels (which the connected vehicle may communicate directly to the fleet management system), and electronically sign the final invoice. An electronic receipt may be sent to the user through the application, email, or other form of electronic communication. If the vehicle is damaged, the application may be used to record/photograph the damage, and the system may then automatically, in real time, calculate a damage charge to add to the user invoice at the time of return. The mobile device may be used to capture the electronic signature of the customer or user returning the vehicle, including the damage charge.

Shuttle Bus Tracking System

In several embodiments, the present invention comprises a system and connected user mobile device interface for tracking one or more shuttle vehicles (e.g., shuttle buses) and providing a visual display thereof (see FIGS. 2-8), along with estimated times of arrival at the connected user's location or at the shuttle vehicle stop closest to the connected user. The tracking system is a learning-based model that tracks vehicle movement to estimate arrival time at predetermined geo-fenced locations based on historical behavior for similar time periods and conditions.

Estimating shuttle bus arrival time at a particular location is difficult for several reasons. First, it is variable based on customer/rider volume and usage: a shuttle vehicle arriving at stop A will spend a longer period of time at stop A if there are a significantly large number of riders who need to unload at stop A, and/or who need to load at stop A. The amount of time the shuttle vehicle stays at stop A will impact its arrival time at the next stop (stop B). Second, shuttle vehicle drivers coordinate in real time, and thus a particular shuttle vehicle may skip a stop where it has no riders to drop and a preceding shuttle vehicle remains, or may "double up" on a stop with another vehicle, depending on customer usage. Finally, general traffic pattern data alone is not accurate to estimate arrival time, as shuttle vehicles often use dedicated lanes or areas that are not subject to typical local traffic usage or patterns. Accordingly, prior art systems that estimate travel or arrival time based on location, assumed travel speed, and/or local traffic usage or patterns, will not provide sufficiently accurate estimates of arrival time in this context.

The shuttle vehicle tracking system of the present invention overcomes the above difficulties by collecting real-time GPS location coordinate data (from a TCU or GPS device or system in the shuttle vehicle) as each shuttle vehicle travels the shuttle route (e.g., from the rental vehicle station or area to various stops at an airport or similar facility), and recording and storing the location and corresponding time (and in some cases, day or date) data. The shuttle route pattern thus is dynamically learned over time for one or a plurality of shuttle vehicles traveling the route. Using "snap-to" algorithms as described below, the location coordinate data is mapped to adjacent roads that the vehicle is traveling, which can be displayed on a map with bus route locations. Thus, there is no initial route mapping and storage: the routes are dynamically learned and tracked based on real-time shuttle vehicle travel. Shuttle travel and location information also may be collected via a low earth orbit microsatellite system, such as that disclosed in U.S. patent application Ser. No. 15/986,504, filed May 22, 2018 and Ser. No. 15/986,375, filed May 22, 2018, both of which are incorporated herein by specific reference for all purposes.

This historical data is used to estimate the travel time between points on the route, and between a current shuttle vehicle location and a point on the route, for different periods of the day. The historical data window may cover several days, weeks, or months. The historical data window may extend backward continuously, or be limited to a selected period of time (e.g., the same holiday period from last year). Variations between the current data being recorded and the historical data can be observed and used to modify the estimated current travel and arrival times. In several embodiments, the system does not use actual general traffic patterns or conditions for determining travel and arrival times.

In several embodiments, users may download an application program on the user computing device (e.g., smart phone, cellphone, tablet computing device, mobile computing device, laptop computer, or the like). The application program allows the user (e.g., customer) to track shuttle vehicles, such as the nearest shuttle vehicle and/or the shuttle vehicle next to arrive at a particular location.

Figure 2:
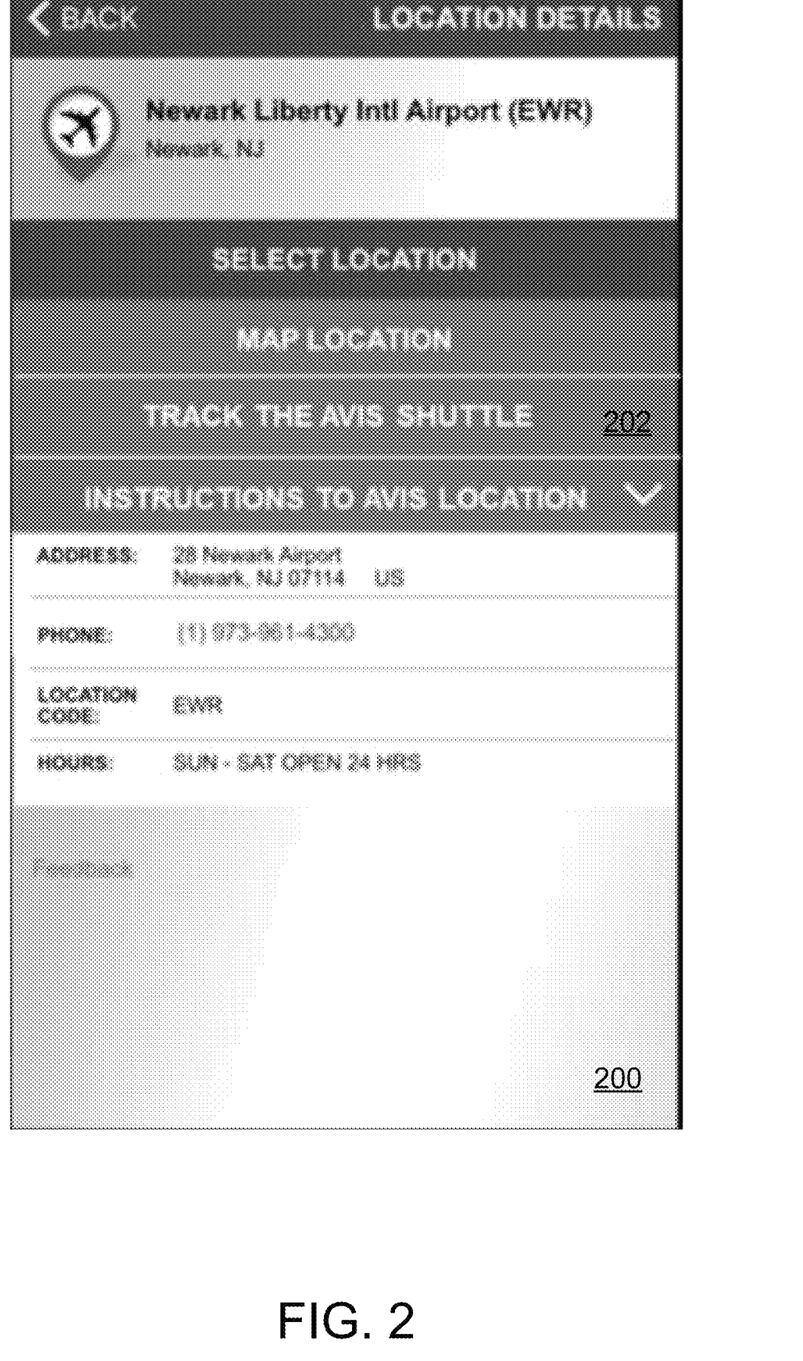
FIG. 2 shows an example of a mobile device interface display.

FIG. 2 is an example of a visual display 200 showing a track shuttle option 202 from a mobile application on a smart phone. The application then displays a map view 204 (which the user can zoom in or out, or reposition to cover a different geographic area) with estimated times 206 for the next shuttle (and following shuttle) to arrive at the user's pick-up/drop-off location (or the pick-up/drop-off location closest to the user's actual location), and estimated times 208 for the next shuttle (and following shuttle) to arrive at the lot or parking area where rental vehicles are located. Note that this lot location can be another location of particular interest, such as a bus depot, or other location of interest at which shuttle vehicles are dropping and pick-up passengers. In some embodiments, no special lot location or similar location of particular interest may be indicated. In some embodiments, multiple locations of special interest may be specially indicated or marked.

Figure 3:
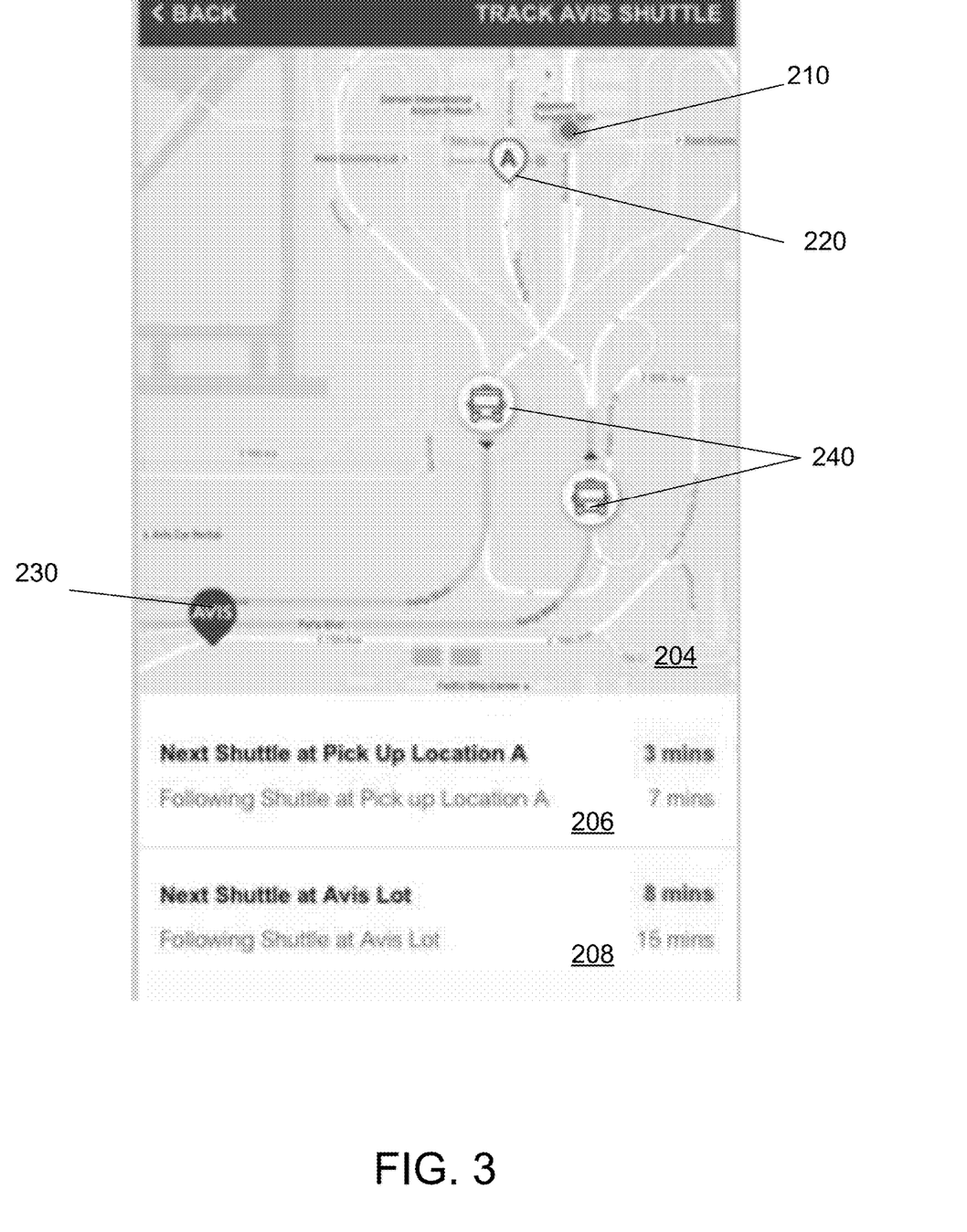
FIG. 3 shows an example of a shuttle tracking map view.

On the map view in FIG. 3 (which shows roads, buildings, and other structures or features in the area), the application also shows the user's location 210 (determined, for example, by GPS systems embedded in the user's computing or mobile device), the closest or user-chosen pick-up location (indicated as "A" here) 220, the lot location or similar location of particular interest 230, and the approximate location 240 of some or all shuttle vehicles on the route. As discussed below, the location of a shuttle vehicle may be determined based upon a report from the vehicle as it enters or exits designated geo-fences (or "sites") on the route. When a shuttle vehicle reports this information to the system server (or servers), the system updates its calculation of estimated arrival time(s) based on historical data and other factors as described above.

Figure 4:
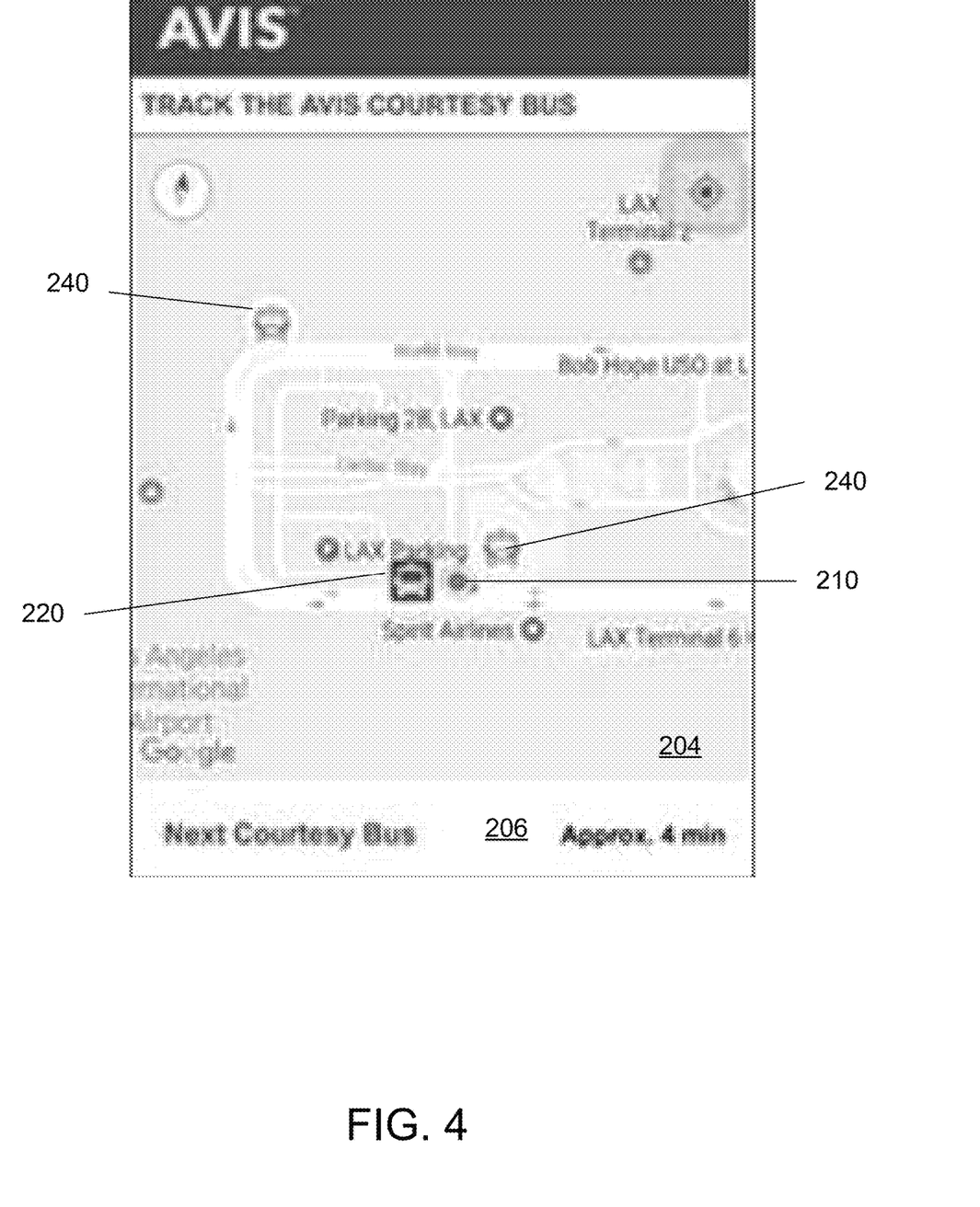
FIGS. 4-8 shows examples of alternative shuttle tracking map views.
Figure 5:
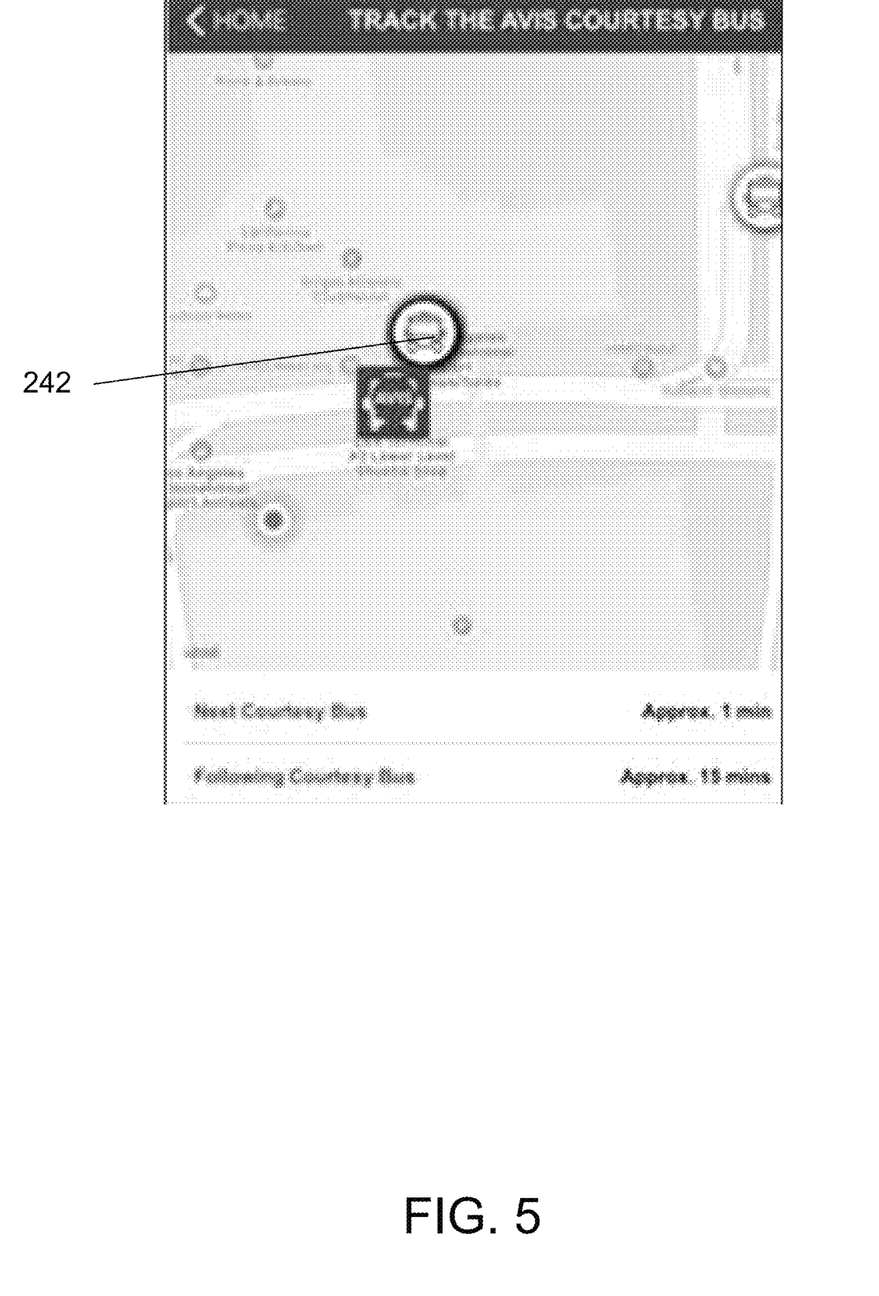
Figure 6:
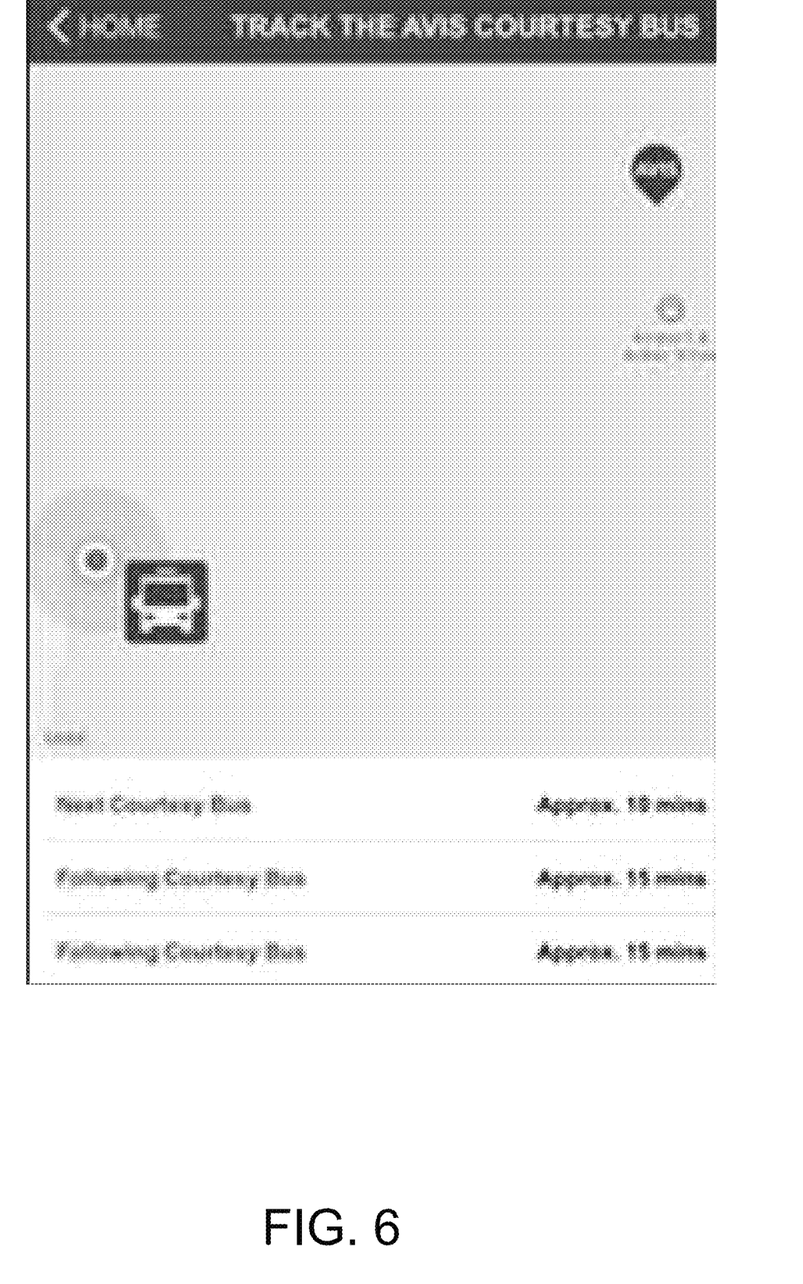
Figure 7:
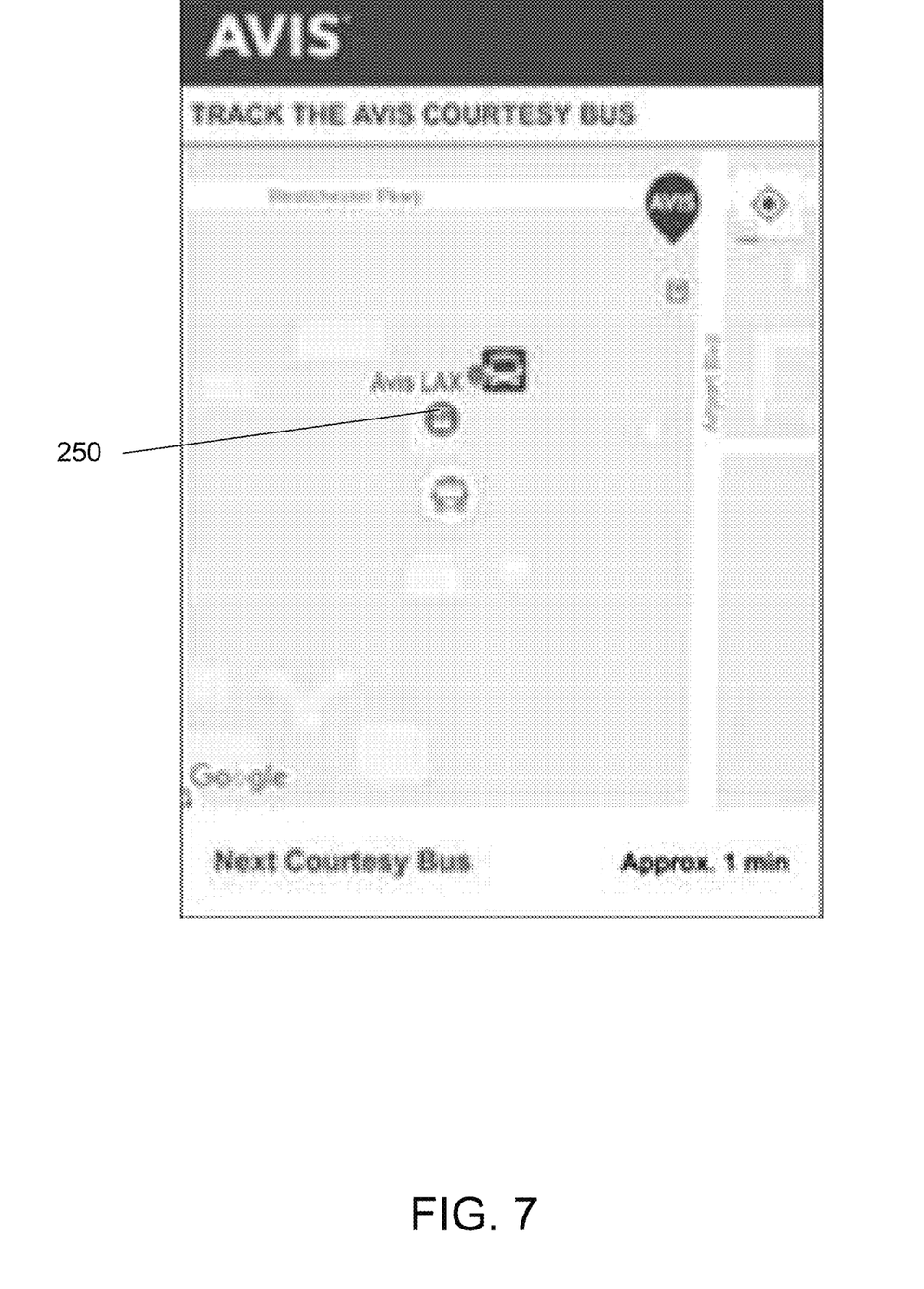
Figure 8:
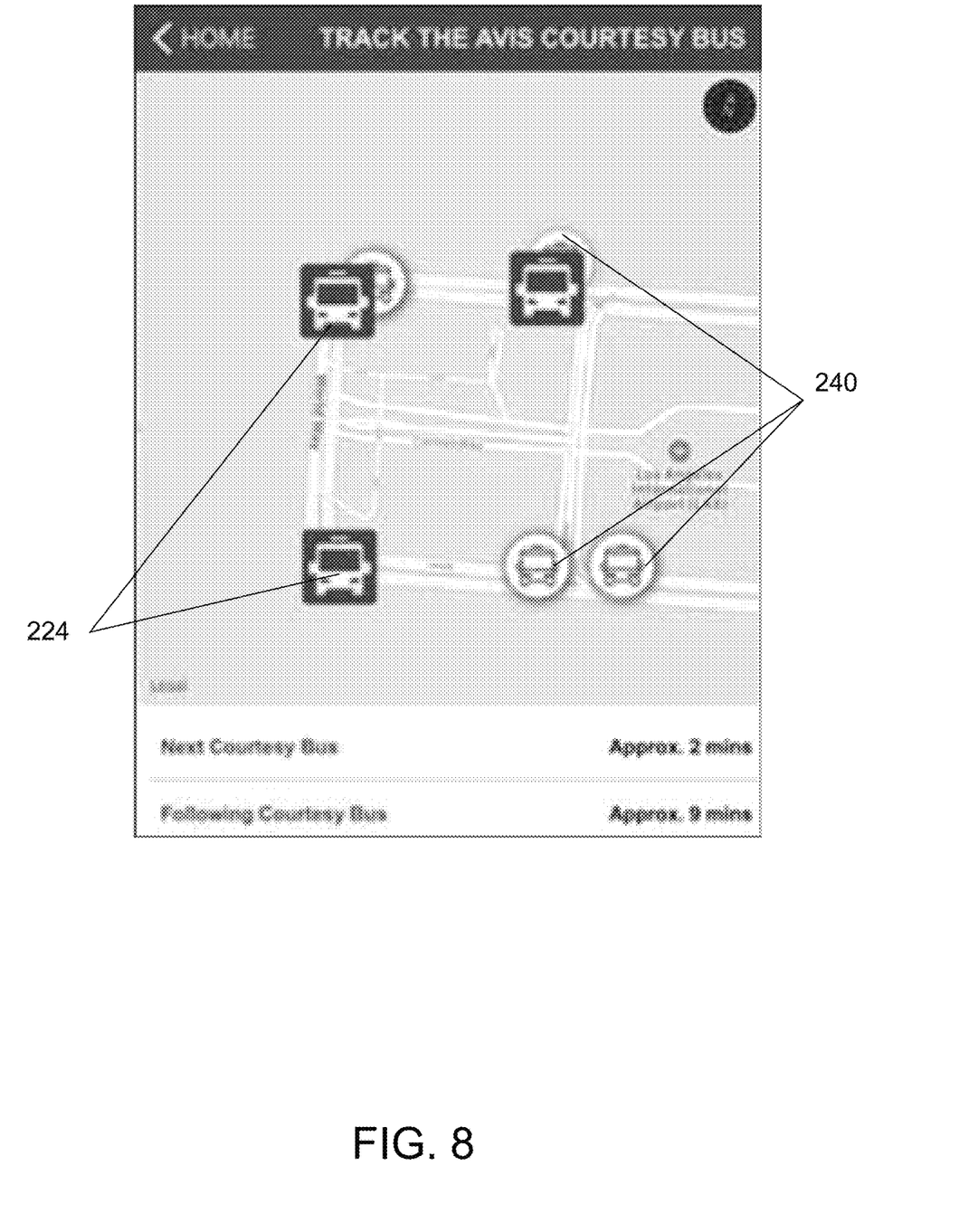

Other icons or graphic indicators may be used. For example, FIG. 4 shows an example of a colored icon indicate the closest pick-up location 220, with two shuttle vehicles shown. FIG. 5 shows a close-up view, with the next shuttle vehicle highlighted 242. FIG. 6 shows a more remote view, with multiple "following" shuttle vehicles indicated. FIG. 7 shows another close-up view, also indicating a rental agency location or booth at the airport 250. FIG. 8 shows another close-up view, with several pick-up drop-off locations 224 and several shuttle vehicles indicated. In some embodiments, the user can select a particular vehicle or stop icon to obtain more information, such the stop or vehicle name or identification information.

The user interface can be modified in scale and scope, and show the location of the customer/user, the real-time location of the closest shuttle vehicle/bus to the customer/user, the real-time location of multiple shuttles/buses on the map, the location of various route stops, and the location of the rental vehicle lot. The interface also will show the estimated time of arrival for the next shuttle vehicle/bus at the customer/user location, or at the shuttle stop nearest the customer/user (in the latter case, the interface also may provide an estimated travel time for the customer/user to reach the shuttle stop). The estimated times of arrival for sequential shuttle vehicles/buses also may be displayed.

The system also may be used by a customer/user on a shuttle vehicle for determining the estimated time of arrival at the next stop or at a selected stop along the route. Further, while the system has been described above in the context of a rental vehicle shuttle bus, it may also be used for tracking other vehicles, especially vehicles travelling along a predetermined route, such as buses, trolleys, or the like.

Figure 9:
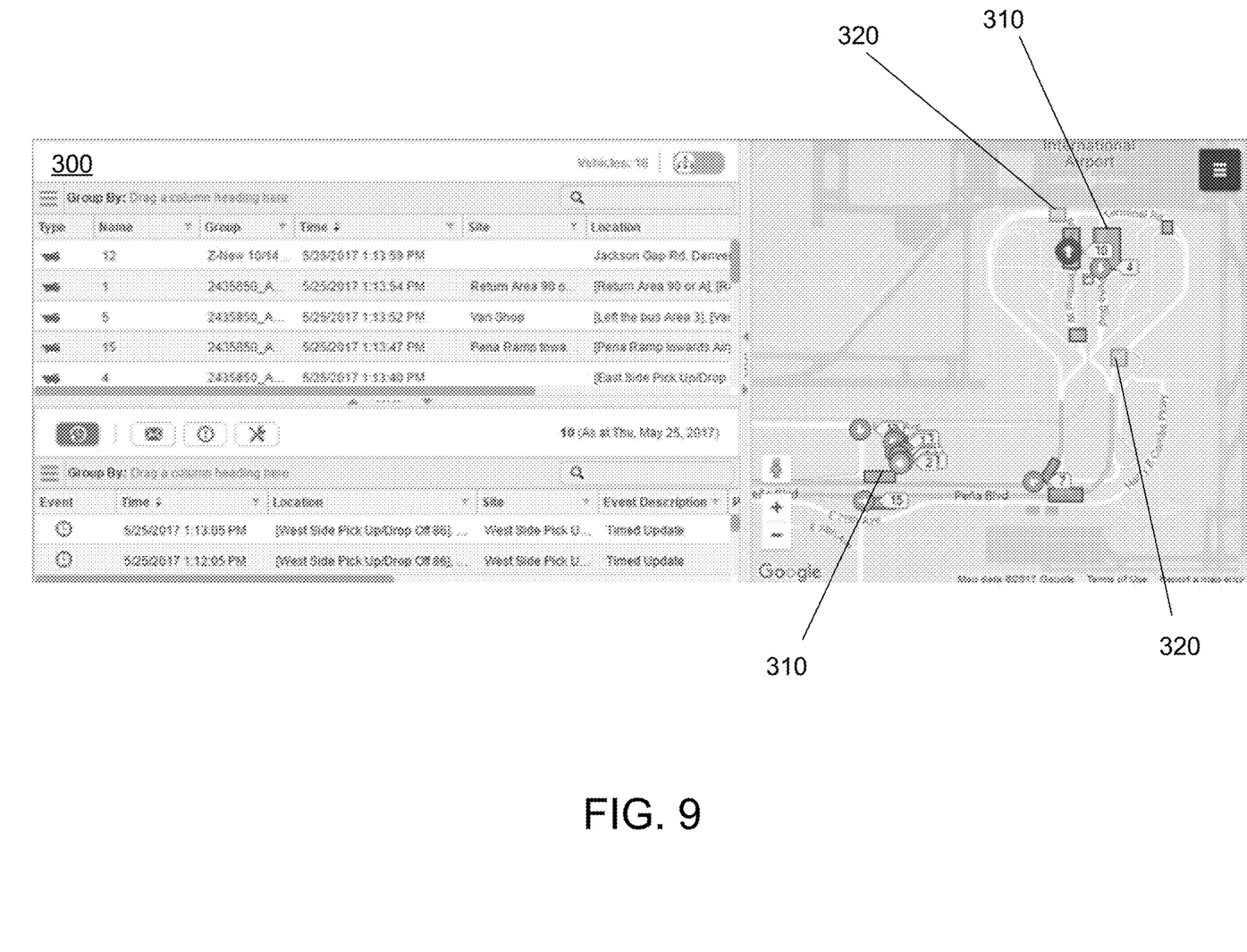
FIG. 9 shows an example of shuttle vehicle route creation interface.

FIG. 9 shows an interface screen 300 for an administrative user to create or modify a shuttle vehicle route for tracking. A series of geo-fence polygons (referred to herein as "sites") are created and superimposed on the roads or other areas that the shuttle vehicles will travel. In this embodiment, there are two types of sites: "Vehicle Stop" (or "Bus Stop") sites 310 and "Vehicle Route" (or "Bus Route") sites 320.

Vehicle Stop sites show all pick-up and drop-off stops on the route, including the rental location or lot, and may be identified by name, description, and/or unique ID number. The location and site description may use to provide more details about the stop or route location, and may be named in accordance with naming conventions adopted for the system. In general, as each shuttle vehicle travels along the route, a system application with route data that has been downloaded to and is operable on a computing device in the shuttle vehicle, records when it has entered one of the defined sites (based on GPS coordinates of the vehicle), and reports it in real time through, e.g., wireless or cellular communications, to the main system server. It may also record and report when it exits one of the defined sites. The main system server then performs estimated arrival time calculations to be sent to customer/user applications (as described above).

Vehicle Route sites show defined points or areas on the vehicle route or routes that are used to provide additional information between Vehicle Stop sites. These sites may be named and identified is a similar manner to Vehicle Stop sites. Any number of Vehicle Route sites may be added, and typically are added if there is a long span between Vehicle Stop sites and the intermediate route site is used to obtain shuttle vehicle location and time data to provide more accurate estimates of arrival times. Vehicle Route sites also may be used if there are points (i.e., Exception Sites) where the route may diverge from the standard or base route (e.g., where the vehicle may take one of two or more paths, or may deviate from the base route to either skip a stop where it has no passengers to drop-off, is too full to take more riders, or other reason).

The system may track multiple shuttle vehicle fleets (such as brands or sub-brands), where each brand or sub-brand has separate vehicles, and routes may vary. In some embodiments, shuttle vehicles are shared, and treated as a single fleet. Each shuttle vehicle is assigned to a fleet, and has a unique name or ID, which may be numeric or alphanumeric. In some embodiments, these vehicle name or ID with identification signage on the vehicle (e.g., on the front of the bus visible to customers), so that users of the mobile device application can match a vehicle with an icon on the application.

Figure 10:
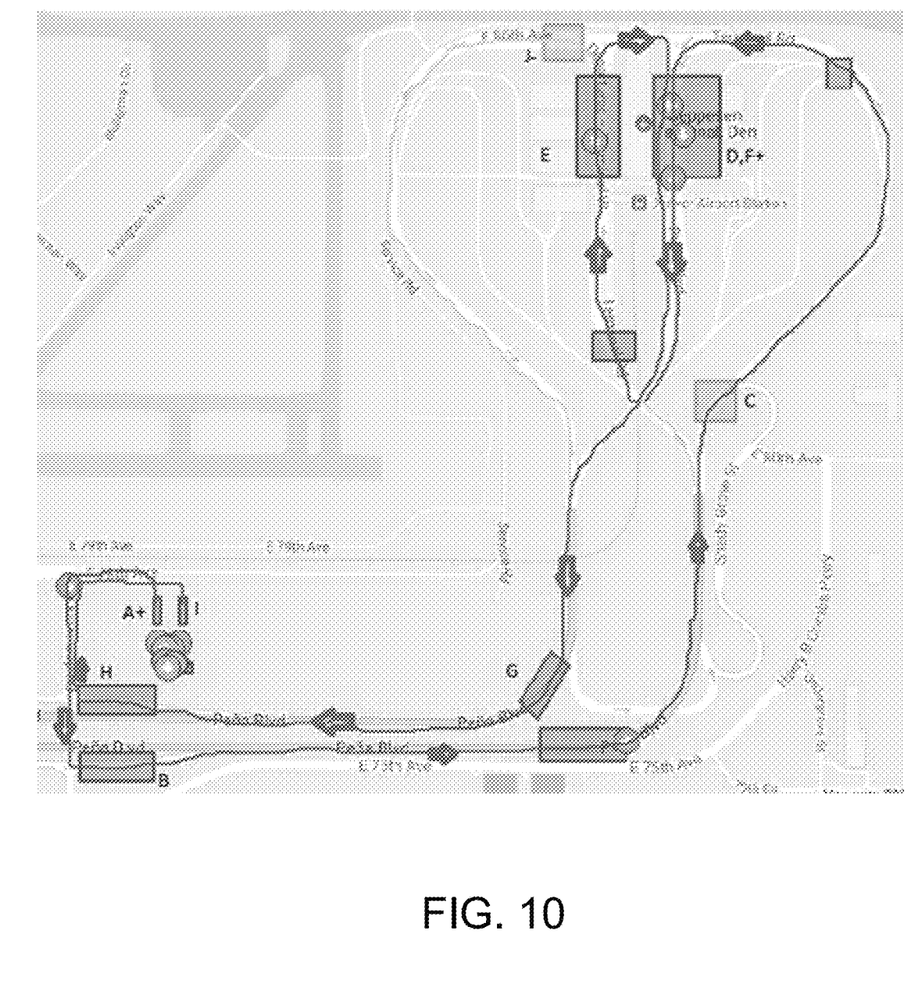
FIG. 10 shows an example of a Default Route map.

In several embodiments, as seen in FIG. 10, the system creates a "Default Route" (or standard or base route), which is the ordered list of stops that each shuttle vehicle will take in traversing the route from beginning to end, assuming no exceptions (i.e., no divergences). The timing of a Default Route for a particular date and/or time assumes that all stops are made in order from beginning to end. All estimated times between stops (and/or sites) are calculated assuming the bus will travel the default route between sites, and using historical travel data (as described above). A shuttle vehicle may change its path while navigating the route for a number of reasons (as described above with regard to Exceptions). If a shuttle vehicle deviates from the Default Route, future arrival times are based on the off-route location of the vehicle as determined by the real-time vehicle location, or if the deviation keeps the vehicle on a known or alternate route mapped in the system, by using historical data in conjunction with new site entry/exit data reported by the vehicle.

FIG. 10 shows an example of a Default Route (the dark (blue) line with travel direction arrows) map with stop and route sites for an airport. The stop and route sites are indicated alphabetically in order of travel, starting with A and ending with I. Pick-up sites (with or without drop-off as well) are indicated with a "+" (drop-off only sites are not specially indicated; e.g., A+ is the pick-up site for the rental service lot, while I is the drop-off only site at the same rental service lot). Some sites are multi-pass sites, e.g., the vehicle passes through the main terminal twice, once for drop-off only (D), and once for pick-up (F+). The light (yellow) lines show common deviations (i.e., Exceptions) from the Default Route. Exception sites are labeled outside the alphabetical travel order of the Default Route, and are denoted with a "−" (e.g., "J−" indicates an Exception Site).

Computer Implementation

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions, and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like), or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface. Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

As used herein, the singular forms "a," "an" and "the" include plural referents unless the context clearly dictates otherwise. Further, the terms "additional", "optional", "optionally", "may" and the like mean that the subsequently described operation, event or functionality mayor may not be required, and that the description includes instances where said operation, event or functionality occurs and instances where it does not. The word "comprise" and variations of that word, and the word "include" and variations of that word, mean "including but not limited to," and are not intended to exclude, for example, other components, steps, or operations. "For example" and "exemplary" mean "an example of" and are not intended to convey an ideal embodiment.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. The system, methods and apparatus of the present invention are not limited to specific components, network connections, or arrangements described and disclosed herein, as such may vary. It is also to be understood that the terminology used herein is for the purpose of describing particular embodiments only, and is not intended to be limiting. Even though specific embodiments of this invention have been described, they are not to be taken as exhaustive. There are several variations that will be apparent to those skilled in the art.

What is claimed is:

1. A system for tracking shuttle vehicles, comprising:
    a plurality of shuttle vehicles, each shuttle vehicle configured with a telematics control unit or a GPS device operable to determine shuttle vehicle location along a planned route, and an in-vehicle computing device with a device microprocessor;
    at least one computer server with a server microprocessor programmed to:
        store a route map encompassing the planned route, wherein the route map comprises one or more geo-fence area polygons corresponding to shuttle vehicle stop sites, and one or more geo-fence area polygons corresponding to shuttle vehicle route sites separate from the shuttle vehicle stop sites; and
        store historical travel time data for shuttle vehicles travelling along the route map;
    wherein the device microprocessor in each shuttle vehicle is programmed to determine when that shuttle vehicle enters or leaves a shuttle vehicle stop site or shuttle vehicle route site, and transmit a report the entering or leaving, and the time thereof, via wireless electronic communications to the at least one computer server; and
    further where the server microprocessor is programmed to calculate an expected time of arrival or until arrival for a shuttle vehicle to arrive at a particular shuttle vehicle stop site based upon the particular shuttle vehicle's last report with regard to entering or leaving a shuttle vehicle stop site or shuttle vehicle route site, a route-based relationship of such reported shuttle vehicle stop site or shuttle vehicle route site to the particular shuttle vehicle stop site, and a selected subset of said historical travel time data.

2. The system of claim 1, wherein the device microprocessor determines when that shuttle vehicle enters or leaves a shuttle vehicle stop site or shuttle vehicle route site by comparing the shuttle vehicle's GPS location as determined by the vehicle's telematics control unit or a GPS device with location data for said geo-fence area polygons along the route.

3. The system of claim 1, a mobile computing device with a microprocessor programmed to:
    receive, via wireless electronic communications in real-time, shuttle vehicle location information from the server microprocessor;
    receive, via wireless electronic communications in real-time, estimated arrival time or times for one or more shuttle vehicles at one or more locations along the planned route; and
    present, on a visual display in real-time, a map showing one or more of the following: location of the mobile computing device; location of one or more shuttle vehicles; and one or more locations along the planned route.

4. The system of claim 3, wherein the one or one or more locations along the planned route comprise one or more shuttle vehicle stop sites.

5. The system of claim 4, further wherein the visual display further comprises one or more estimates of time for a shuttle vehicle to arrive at a particular shuttle vehicle stop site.

6. The system of claim 1, wherein the calculation of expected time of arrival or until arrival is not based on general traffic usage, patterns, or conditions for the area in which the planned route is located.

7. The system of claim 1, wherein the selected subset of said historical travel data is for a particular time of day.

8. The system of claim 1, wherein the selected subset of said historical travel data is for a particular date or day of the week.

9. The system of claim 1, wherein the selected subset of said historical travel data is from a historical data window.

10. The system of claim 9, wherein the historical data window extends back continuously for a set period of time from the time of calculation.

11. The system of claim 9, wherein the historical data window is limited to a selected period of time from the prior year.

12. The system of claim 1, wherein the plurality of shuttle vehicles comprise shuttle buses at an airport.

13. The system of claim 1, wherein the plurality of shuttle vehicles comprise passenger buses.

14. The system of claim 1, wherein the shuttle vehicle route sites include deviation sites not overlaying the planned route, and are placed to indicate shuttle vehicle deviations from the planned route.

* * * * *